United States Patent
Guo et al.

(10) Patent No.: US 11,664,872 B2
(45) Date of Patent: May 30, 2023

(54) BEAM DETECTION METHOD AND DEVICE, BEAM ADJUSTING METHOD AND DEVICE, ANTENNA MODULE SELECTION METHOD AND DEVICE, AND COMPUTER READABLE STORAGE MEDIA

(71) Applicant: SPREADTRUM COMMUNICATIONS (SHANGHAI) CO., LTD., Shanghai (CN)

(72) Inventors: Shusheng Guo, Shanghai (CN); Jiewei Lai, Shanghai (CN); Kai Kang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 245 days.

(21) Appl. No.: 16/976,597

(22) PCT Filed: Jan. 6, 2020

(86) PCT No.: PCT/CN2020/070388
§ 371 (c)(1),
(2) Date: Aug. 28, 2020

(87) PCT Pub. No.: WO2020/156038
PCT Pub. Date: Aug. 6, 2020

(65) Prior Publication Data
US 2021/0050899 A1 Feb. 18, 2021

(30) Foreign Application Priority Data

Jan. 31, 2019 (CN) .......................... 201910097995.0
Jan. 31, 2019 (CN) .......................... 201910098028.6
Jan. 31, 2019 (CN) .......................... 201910098508.2

(51) Int. Cl.
| H04B 7/02 | (2018.01) |
| H04B 7/06 | (2006.01) |
| H04B 7/0456 | (2017.01) |

(52) U.S. Cl.
CPC ......... H04B 7/0695 (2013.01); H04B 7/0456 (2013.01); H04B 7/0639 (2013.01)

(58) Field of Classification Search
CPC ... H04B 7/0695; H04B 7/0456; H04B 7/0639
(Continued)

(56) References Cited

U.S. PATENT DOCUMENTS

2009/0243397 A1  10/2009  Cook et al.
2012/0295539 A1  11/2012  McCormack et al.
(Continued)

FOREIGN PATENT DOCUMENTS

CN  101978746 A  2/2011
CN  103502837 A  1/2014
(Continued)

OTHER PUBLICATIONS

CNIPA 1st Office Action for corresponding CN Application No. 201910097995.0; dated Jan. 5, 2021.
(Continued)

*Primary Examiner* — Zewdu A Kassa
(74) *Attorney, Agent, or Firm* — Cantor Colburn LLP

(57) ABSTRACT

Beam detection method and device, beam adjusting method and device, antenna module selection method and device, and computer readable storage media are provided. The antenna module selection method is applied in a terminal device including first and second AiPs, and the method includes: the ULA array in the first AiP detecting signals emitted by the UPA array in the first AiP, and comparing detected characteristic parameter values of the signals emitted by the UPA array in the first AiP withe a first preset group (Continued)

of characteristics parameter values; the ULA array in the second AiP detecting signals emitted by the UPA array in the second AiP, and comparing detected characteristic parameter values of the signals emitted by the UPA array in the second AiP with a second preset group of characteristic parameter values: determining to use the first or second AiP for signal transmission and reception based on the comparison.

7 Claims, 4 Drawing Sheets

(58) Field of Classification Search
USPC .............. 375/262, 261, 259, 219, 295, 316
See application file for complete search history.

(56) References Cited

U.S. PATENT DOCUMENTS

| | | | |
|---|---|---|---|
| 2013/0271331 | A1 | 10/2013 | Redd |
| 2013/0313692 | A1 | 11/2013 | Soler Castany et al. |
| 2014/0334566 | A1 | 11/2014 | Kim et al. |
| 2015/0002330 | A1 | 1/2015 | Binzer et al. |
| 2018/0248596 | A1 | 8/2018 | Xiao et al. |
| 2018/0342810 | A1 | 11/2018 | Yu et al. |
| 2020/0052367 | A1 | 2/2020 | Zhu et al. |
| 2020/0052372 | A1 | 2/2020 | Xia et al. |
| 2020/0161766 | A1 | 5/2020 | Liu et al. |
| 2020/0212978 | A1* | 7/2020 | Zhao .................. H04B 7/0469 |
| 2022/0060231 | A1* | 2/2022 | Jaldén .................. H04B 7/0617 |

FOREIGN PATENT DOCUMENTS

| | | |
|---|---|---|
| CN | 103947126 A | 7/2014 |
| CN | 104321930 A | 1/2015 |
| CN | 104656055 A | 5/2015 |
| CN | 105210306 A | 12/2015 |
| CN | 107040296 A | 8/2017 |
| CN | 107682038 A | 2/2018 |
| CN | 108879114 A | 11/2018 |
| CN | 109088180 A | 12/2018 |
| CN | 109149068 A | 1/2019 |
| WO | 2017222471 A1 | 12/2017 |
| WO | 2018124950 A1 | 7/2018 |
| WO | 2018203640 A1 | 11/2018 |

OTHER PUBLICATIONS

CNIPA Office Action for corresponding CN Application No. 201910098028.6, dated Nov. 11, 2020.
CNIPA Office Action for corresponding CN Application No. 201910098508.2, dated Oct. 27, 2020.
Huawei, "Antenna structure: impact on MIMO transmission and remaining modeling issues," R1-166109, 3GPP TSG RAN WGI Meeting #86, Aug. 26, 2016, 7 pages.
International Search Report for International Application No. PCT/CN2020/070388; dated Apr. 2, 2020.
Wei, et al., "Direction of Arrival Estimation with Uniform Planar Array" IEEE, Dec. 21, 2017, 5 pages.

* cited by examiner

BEAM DETECTION METHOD AND DEVICE, BEAM ADJUSTING METHOD AND DEVICE, ANTENNA MODULE SELECTION METHOD AND DEVICE, AND COMPUTER READABLE STORAGE MEDIA

CROSS-REFERENCE TO RELATED APPLICATIONS

This application is the national stage of International Application No. PCT/CN2020/070388, filed on Jan. 6, 2020, Priority under 35 U. S. C. 119(a) and 3.5 U. S. C. 365(b) is claimed from Chinese Patent Application No. 201910097995.0, filed on Jan. 31, 2019, and entitled "Beam detection method and device based on AiP structure, and computer readable storage medium", Chinese Patent Application No. 201910098028.6, filed on Jan. 31, 2019, and entitled "Beam adjusting method and device based on AiP structure, and computer readable storage medium", and Chinese Patent Application No. 201910098508.2, filed on Jan. 31, 2019, and entitled "Antenna module selection method and device, terminal device and computer readable storage medium", the entire disclosure of which is incorporated herein by reference.

TECHNICAL FIELD

The present disclosure generally relates to communication field, and more particularly, to a beam detection method and device, a beam adjusting method and device, an antenna module selection method and device, and computer readable storage media.

BACKGROUND

Array antennas and beam forming technology are applied in 5G millimeter wave mobile communication systems, and package antenna technology is applied in 5G terminal millimeter wave chips, which has significant direction selectivity. Rapid and accurate beam alignment and tracking at a transmitter and a receiver is an essential technology for achieving millimeter wave communication. Signals at a millimeter wave band have fast attenuation and poor scattering and diffraction property, thus they are prone to be blocked. Energy of the signals can be concentrated through narrow beams, and beam directions can be dynamically tracked and adjusted through beam management, so as to adapt to quick change of channels at the millimeter wave band.

In some existing solutions, a terminal performs various beam scanning through a Radio Resource Control (RRC) protocol in a network, and performs beam management in combination with related alignment strategy. However, the existing solutions occupy lots of network resources and require plenty of baseband processing at the terminal, and accordingly much power consumption is generated.

In other existing solutions, antennas or an induction device dedicated to radio frequency environment detection, and corresponding electric tuning elements, signal processing and control circuits are added to a terminal. However, these hardware structures are difficult to integrate with a main communication system chipset in the terminal, which significantly increases the number of elements, size and cost of the terminal.

SUMMARY

Embodiments of the present disclosure provide a beam detection method and device based on an Antenna in Package (AiP) structure, a beam adjusting method and device based on an AiP structure, and an antenna module selection method and device.

In an embodiment of the present disclosure, a beam detection method based on an AiP structure is provided, wherein the AiP structure at least includes a first AiP, the first AiP includes at least one Uniform Linear Array (ULA) array and at least one corresponding Uniform Planar Array (UPA) array, and the method includes: the at least one ULA array detecting signals emitted by the at least one corresponding UPA array respectively; and storing a first group of detection result, wherein the first group of detection result includes detected characteristic parameter values of the signals emitted by the at least one UPA array.

Optionally, the first group of detection result includes any combination of following parameters: direction angles, a ratio of a main lobe to a side lobe, side lobe suppression, or power of beams corresponding to the signals emitted by the at least one UPA array which are detected by the at least one ULA array.

Optionally, the signals emitted by the at least one UPA array are millimeter wave signals.

Optionally, each of the at least one ULA array includes a plurality of antenna units, each of the at least one UPA array includes a plurality of antenna units, and the at least one ULA array detecting the signals emitted by the at least one corresponding UPA array respectively includes: the plurality of antenna units included in the at least one ULA array detecting signals emitted by the plurality of antenna units included in the at least one corresponding UPA array respectively.

Optionally, the AiP structure further includes a second AiP, and the method further includes: at least one ULA array in the second AiP detecting signals emitted by the at least one UPA array in the first AiP respectively; and storing a second group of detection result, wherein the second group of detection result includes characteristic parameter values of the signals emitted by the at least one UPA array in the first AiP which are detected by the at least one ULA array in the second AiP.

Optionally, the AiP structure further includes a second AiP, and the method further includes: at least one ULA array in the second AiP detecting signals emitted by at least one corresponding UPA array in the second AiP respectively; and storing a third group of detection result, wherein the third group of detection result includes characteristic parameter values of the signals emitted by the at least one UPA array in the second AiP which are detected by the at least one ULA array in the second AiP.

Optionally, the method is applied when the AiP structure is in an unobstructed state, and the detected characteristic parameter values of the signals emitted by the at least one UPA array serve as preset characteristic parameter values when the AiP structure is designed.

Optionally, the first group of detection result, the second group of detection result and the third group of detection result are stored in a look-up table (LUT).

In an embodiment of the present disclosure, a beam detection device based on an AiP structure is provided, wherein the AiP structure at least includes a first AiP, the first AiP includes at least one ULA array and at least one corresponding UPA array, and the device includes: a controlling circuitry configured to control the at least one ULA array to detect signals emitted by the at least one corresponding UPA array respectively; and a storing circuitry configured to store a first group of detection result, wherein the first group of detection result includes detected characteristic parameter values of the signals emitted by the at least one UPA array.

Optionally, the first group of detection result includes any combination of following parameters: direction angles, a ratio of a main lobe to a side lobe, side lobe suppression, or power of beams corresponding to the signals emitted by the at least one UPA array.

Optionally, the signals emitted by the at least one UPA array are millimeter wave signals.

Optionally, each of the at least one ULA array includes a plurality of antenna units, each of the at least one UPA array includes a plurality of antenna units, and the controlling circuitry is configured to control the plurality of antenna units included in the at least one ULA array to detect signals emitted by the plurality of antenna units included in the at least one corresponding UPA array respectively.

Optionally, the AiP structure further includes a second AiP, the controlling circuitry is further configured to control at least one ULA array in the second AiP to detect signals emitted by the at least one UPA array in the first AiP respectively, and the storing circuitry is further configured to store a second group of detection result, wherein the second group of detection result includes characteristic parameter values of the signals emitted by the at least one UPA array in the first AiP which are detected by the at least one ULA array in the second AiP.

Optionally, the AiP structure further includes a second AiP, the controlling circuitry is further configured to control at least one ULA array in the second AiP to detect signals emitted by at least one corresponding UPA array in the second AiP respectively, and the storing circuitry is further configured to store a third group of detection result, wherein the third group of detection result includes characteristic parameter values of the signals emitted by the at least one UPA array in the second AiP which are detected by the at least one ULA array in the second AiP.

Optionally, the detected characteristic parameter values of the signals emitted by the at least one UPA array serve as preset characteristic parameter values when the AiP structure is designed.

Optionally, the storing circuitry is configured to store the first group of detection result, the second group of detection result and the third group of detection result in a look-up table (LUT).

In an embodiment of the present disclosure, a computer readable storage medium having computer instructions stored therein is provided, wherein when the computer instructions are executed, the above beam detection method based on the AiP structure is performed.

In an embodiment of the present disclosure, a beam adjusting method based on an AiP structure is provided, wherein the AiP structure at least includes a first AiP, the first AiP includes at least one ULA array and at least one corresponding UPA array, and the method includes: the at least one ULA array detecting signals emitted by the at least one corresponding UPA array respectively; comparing detected characteristic parameter values of the signals with a first preset group of signal characteristic parameter values, to obtain a first comparison result; and adjusting a phase shifter coupled with the at least one UPA array based on the first comparison result until a first optimal beam configuration is reached.

Optionally, the detected characteristic parameter values of the signals include any combination of following parameters: direction angles, a ratio of a main lobe to a side lobe, side lobe suppression, or power of beams corresponding to the signals emitted by the at least one UPA array which are detected by the at least one ULA array.

Optionally, reaching the first optimal beam configuration includes: deviation of power of beams corresponding to the signals emitted by the at least one UPA array from a preset power being within 10%, or deviation of side lobe suppression of beams corresponding to the signals emitted by the at least one UPA array from a preset side lobe suppression being within 10%.

Optionally, when the first optimal beam configuration is reached, the side lobe suppression of the beams corresponding to the signals emitted by the at least one UPA array is 15 dB.

Optionally, the AiP structure is disposed in a terminal device.

Optionally, the first preset group of signal characteristic parameter values includes: characteristic parameter values of the signals emitted by the at least one UPA array which are detected by the at least one ULA array when the AiP structure is in an unobstructed state.

Optionally, the method further includes: storing the first optimal beam configuration.

Optionally, the AiP structure further includes a second AiP, the second AiP includes at least one ULA array and at least one corresponding UPA array, and the method further includes: the at least one ULA array in the second AiP detecting signals emitted by the at least one UPA array in the first AiP; comparing characteristic parameter values of the signals emitted by the at least one UPA array in the first AiP which are detected by the at least one ULA array in the second AiP with a second preset group of signal characteristic parameter values, to obtain a second comparison result; and adjusting the phase shifter coupled with the at least one UPA array in the first AiP based on the second comparison result until a second optimal beam configuration is reached.

Optionally, the characteristic parameter values of the signals emitted by the at least one UPA array in the first AiP which are detected by the at least one ULA array in the second AiP include any combination of following parameters: direction angles, a ratio of a main lobe to a side lobe, side lobe suppression, or power of beams corresponding to the signals emitted by the at least one UPA array in the first AiP which are detected by the at least one ULA array in the second AiP.

Optionally, the AiP structure further includes a second AiP, the second AiP includes at least one ULA array and at least one corresponding UPA array, and the method further includes: the at least one ULA array in the second AiP detecting signals emitted by the at least one UPA array in the second AiP; comparing characteristic parameter values of the signals emitted by the at least one UPA array in the second AiP which are detected by the at least one ULA array in the second AiP with a third preset group of signal characteristic parameter values, to obtain a third comparison result; and adjusting a phase shifter coupled with the at least one UPA array in the second AiP based on the third comparison result until a third optimal beam configuration is reached.

Optionally, the second preset group of signal characteristic parameter values includes: characteristic parameter values of the signals emitted by the at least one UPA array in the first AiP which are detected by the at least one ULA array in the second AiP when the AiP structure is in an unobstructed state.

Optionally, the third preset group of signal characteristic parameter values includes: characteristic parameter values of the signals emitted by the at least one UPA array in the second AiP which are detected by the at least one ULA array in the second AiP when the AiP structure is in an unobstructed state.

In an embodiment of the present disclosure, a beam adjusting device based on an AiP structure is provided, wherein the AiP structure at least includes a first AiP, the first AiP includes at least one ULA array and at least one corresponding UPA array, and the device includes: a controlling circuitry configured to control the at least one ULA array to detect signals emitted by the at least one corresponding UPA array respectively; a comparing circuitry configured to compare detected characteristic parameter values of the signals with a first preset group of signal characteristic parameter values, to obtain a first comparison result; and a processing circuitry configured to adjust a phase shifter coupled with the at least one UPA array based on the first comparison result until a first optimal beam configuration is reached.

Optionally, the detected characteristic parameter values of the signals include any combination of following parameters: direction angles, a ratio of a main lobe to a side lobe, side lobe suppression, or power of beams corresponding to the signals emitted by the at least one UPA array which are detected by the at least one ULA array.

Optionally, reaching the first optimal beam configuration includes: deviation of power of beams corresponding to the signals emitted by the at least one UPA array from a preset power being within 10%, or deviation of side lobe suppression of beams corresponding to the signals emitted by the at least one UPA array from a preset side lobe suppression being within 10%.

Optionally, when the first optimal beam configuration is reached, the side lobe suppression of the beams corresponding to the signals emitted by the at least one UPA array is 15 dB.

Optionally, the AiP structure is disposed in a terminal device.

Optionally, the first preset group of signal characteristic parameter values includes: characteristic parameter values of the signals emitted by the at least one UPA array which are detected by the at least one ULA array when the AiP structure is in an unobstructed state.

Optionally, the device further includes: a storing circuitry configured to store the first optimal beam configuration.

Optionally, the AiP structure further includes a second AiP, the second AiP includes at least one ULA array and at least one corresponding UPA array, the controlling circuitry is further configured to control the at least one ULA array in the second AiP to detect signals emitted by the at least one UPA array in the first AiP, the comparing circuitry is further configured to compare characteristic parameter values of the signals emitted by the at least one UPA array in the first AiP which are detected by the at least one ULA array in the second AiP with a second preset group of signal characteristic parameter values, to obtain a second comparison result, and the processing circuitry is further configured to adjust the phase shifter coupled with the at least one UPA array in the first AiP based on the second comparison result until a second optimal beam configuration is reached.

Optionally, the characteristic parameter values of the signals emitted by the at least one UPA array in the first AiP which are detected by the at least one ULA array in the second AiP include any combination of following parameters: direction angles, a ratio of a main lobe to a side lobe, side lobe suppression, or power of beams corresponding to the signals emitted by the at least one UPA array in the first AiP which are detected by the at least one ULA array in the second AiP.

Optionally, the AiP structure further includes a second AiP, the second AiP includes at least one ULA array and at least one corresponding UPA array, the controlling circuitry is further configured to control the at least one ULA array in the second AiP to detect signals emitted by the at least one UPA array in the second AiP, the comparing circuitry is further configured to compare characteristic parameter values of the signals emitted by the at least one UPA array in the second AiP which are detected by the at least one ULA array in the second AiP with a third preset group of signal characteristic parameter values, to obtain a third comparison result, and the processing circuitry is further configured to adjust a phase shifter coupled with the at least one UPA array in the second AiP based on the third comparison result until a third optimal beam configuration is reached.

Optionally, the second preset group of signal characteristic parameter values includes: characteristic parameter values of the signals emitted by the at least one UPA array in the first AiP which are detected by the at least one ULA array in the second AiP when the AiP structure is in an unobstructed state.

Optionally, the third preset group of signal characteristic parameter values includes: characteristic parameter values of the signals emitted by the at least one UPA array in the second AiP which are detected by the at least one ULA array in the second AiP when the AiP structure is in an unobstructed state.

In an embodiment of the present disclosure, a computer readable storage medium having computer instructions stored therein is provided, wherein when the computer instructions are executed, the above beam adjusting method based on the AiP structure is performed.

In an embodiment of the present disclosure, an antenna module selection method applied to a terminal device is provided, wherein the terminal device at least includes a first AiP and a second AiP, each of the first and second AiPs includes at least one ULA array and at least one corresponding UPA array, and the method includes: the at least one ULA array in the first AiP detecting signals emitted by the at least one corresponding UPA array in the first AiP, and comparing detected characteristic parameter values of the signals emitted by the at least one corresponding UPA array in the first AiP with a first preset group of characteristic parameter values to obtain a first comparison result; the at least one ULA array in the second AiP detecting signals emitted by the at least one corresponding UPA array in the second AiP, and comparing detected characteristic parameter values of the signals emitted by the at least one corresponding UPA array in the second AiP with a second preset group of characteristic parameter values to obtain a second comparison result; and determining to use the first AiP or the second AiP for signal transmission and reception of the terminal device based on the first comparison result and the second comparison result.

Optionally, the characteristic parameter values include at least one of the following: power of beams corresponding to the signals, or a size of a side lobe of beams corresponding to the signals.

Optionally, comparing detected characteristic parameter values of the signals emitted by the at least one corresponding UPA array in the first AiP with a first preset group of characteristic parameter values to obtain a first comparison result includes: calculating a first difference between the detected characteristic parameter values of the signals emitted by the at least one corresponding UPA array in the first AiP and the first preset group of characteristic parameter values; and calculating a first ratio of the first difference to the first preset group of characteristic parameter values as the first comparison result.

Optionally, comparing detected characteristic parameter values of the signals emitted by the at least one corresponding UPA array in the second AiP with a second preset group of characteristic parameter values to obtain a second comparison result includes: calculating a second difference between the detected characteristic parameter values of the signals emitted by the at least one corresponding UPA array in the second AiP and the second preset group of characteristic parameter values; and calculating a second ratio of the second difference to the second preset group of characteristic parameter values as the second comparison result.

Optionally, determining to use the first AiP or the second AiP for signal transmission and reception of the terminal device based on the first comparison result and the second comparison result includes: comparing the first ratio with the second ratio; and selecting the AiP corresponding to the smaller ratio of the first and second ratios for signal transmission and reception of the terminal device.

Optionally, using the first AiP or the second AiP for signal transmission and reception of the terminal device includes: using the at least one UPA array in the first AiP for signal transmission and reception of the terminal device, or using the at least one UPA array in the second AiP for signal transmission and reception of the terminal device.

Optionally, the method further includes: if both the first comparison result and the second comparison result exceed a predetermined threshold, using the at least one ULA array in the first AiP for signal transmission and reception of the terminal device, or using the at least one ULA array in the second AiP for signal transmission and reception of the terminal device.

Optionally, the method further includes: if both the first comparison result and the second comparison result exceed a predetermined threshold, using an RRC protocol to perform beam scanning management.

In an embodiment of the present disclosure, an antenna module selection device applied to a terminal device is provided, wherein the terminal device at least includes a first AiP and a second AiP, each of the first and second AiPs includes at least one ULA array and at least one corresponding UPA array, and the antenna module selection device includes: a controlling circuitry configured to control the at least one ULA array in the first AiP to detect signals emitted by the at least one corresponding UPA array in the first AiP, and control the at least one ULA array in the second AiP to detect signals emitted by the at least one corresponding UPA array in the second AiP; a comparing circuitry configured to compare detected characteristic parameter values of the signals emitted by the at least one corresponding UPA array in the first AiP with a first preset group of characteristic parameter values to obtain a first comparison result, and compare detected characteristic parameter values of the signals emitted by the at least one corresponding UPA array in the second AiP with a second preset group of characteristic parameter values to obtain a second comparison result; and a determining circuitry configured to determine to use the first AiP or the second AiP for signal transmission and reception of the terminal device based on the first comparison result and the second comparison result.

Optionally, the characteristic parameter values include at least one of the following: power of beams corresponding to the signals, or a size of a side lobe of beams corresponding to the signals.

Optionally, the comparing circuitry is further configured to: calculate a first difference between the detected characteristic parameter values of the signals emitted by the at least one corresponding UPA array in the first AiP and the first preset group of characteristic parameter values; and calculate a first ratio of the first difference to the first preset group of characteristic parameter values as the first comparison result.

Optionally, the comparing circuitry is further configured to: calculate a second difference between the detected characteristic parameter values of the signals emitted by the at least one corresponding UPA array in the second AiP and the second preset group of characteristic parameter values; and calculate a second ratio of the second difference to the second preset group of characteristic parameter values as the second comparison result.

Optionally, the determining circuitry is further configured to: compare the first ratio with the second ratio; and select the AiP corresponding to the smaller ratio of the first and second ratios for signal transmission and reception of the terminal device.

Optionally, the determining circuitry is further configured to: determine to use the at least one UPA array in the first AiP for signal transmission and reception of the terminal device, or to use the at least one UPA array in the second AiP for signal transmission and reception of the terminal device.

Optionally, the determining circuitry is further configured to: if both the first comparison result and the second comparison result exceed a predetermined threshold, determine to use the at least one ULA array in the first AiP for signal transmission and reception of the terminal device, or to use the at least one ULA array in the second AiP for signal transmission and reception of the terminal device.

Optionally, the determining circuitry is further configured to: if both the first comparison result and the second comparison result exceed a predetermined threshold, determine to use an RRC protocol to perform beam scanning management.

In an embodiment of the present disclosure, a computer readable storage medium having computer instructions stored therein is provided, wherein when the computer instructions are executed, the above antenna module selection method applied to the terminal device is performed.

Embodiments of the present disclosure may provide following advantages.

In the beam detection method and device based on the AiP structure provided by embodiments of the present disclosure, the signals emitted by the UPA array in the AiP structure are detected by the corresponding ULA array in the AiP structure, and the detection result is stored. The method may be applied after the design of the AiP structure is finalized. At this time, a fixed physical channel is formed between the UPA array and the ULA array. When the UPA array emits a specific signal, a relatively fixed signal can be detected through the corresponding ULA array. There is no excess obstruction around the AiP structure, that is, the AiP structure is in a relatively ideal environment, and thus the detected result can serve as a preset threshold when the AiP structure is designed. By storing the above detected result, parameter values of signals detected when there is obstruction around the AiP structure can be compared with the stored detected result (i.e., the preset threshold value), and based on the comparison result, a deviation between actually emitted beams and an original design can be determined, so as to adjust the beams accordingly.

Further, in the beam adjusting method and device based on the AiP structure provided by embodiments of the present disclosure, the signals emitted by the UPA array in the AiP structure are detected by the corresponding ULA array in the AiP structure, the detected characteristic parameter values of the signals are compared with the preset signal characteristic parameter values, the phase shifter coupled with the UPA array is adjusted based on the comparison result until the optimal beam configuration is reached, and the optimal beam configuration is stored. The method may be applied when the AiP structure is installed in a terminal device. At this time, circuit components and housings around the AiP structure define a definite physical environment. When the UPA array emits a specific signal, the corresponding ULA array can detect a relatively fixed signal. As there is certain obstruction around the AiP structure (i.e., the surrounding circuit components and housings), there is a certain difference between the detected signal characteristic parameter values and the preset signal characteristic parameter values, and the optimal beam configuration for the AiP may be reached by adjusting the corresponding phase shifter.

Further, storing the optimal beam configuration has following advantages. When the terminal device including the AiP structure is applied in practice, there will be more obstruction around it. In this case, detected parameter values of signals can be compared with the stored optimal beam configuration, and the AiP with better performance in the AiP structure can be selected for signal transmission and reception based on the comparison result.

Further, in the antenna module selection method and device provided by embodiments of the present disclosure, the signals emitted by the UPA array in the AiP are detected by the corresponding ULA array in the AiP, the characteristic parameter values of the signals detected by multiple AiPs are compared with the preset signal characteristic parameter values, and the AiP with better performance is selected for signal transmission and reception of the terminal device based on the comparison result. In this way, local detection and management of the beams by the terminal are realized, and no additional hardware is needed, which saves network resources and reduces cost and power consumption of the terminal.

Further, the UPA array in the AiP is used for signal transmission and reception by default. If it is detected that beam performance of the signals emitted by the UPA arrays is not good, the ULA array in the AiP may be used for signal transmission and reception.

Further, the UPA array in the AiP is used for signal transmission and reception by default. If it is detected that beam performance of the signals emitted by the UPA arrays is not good, the RRC protocol may be used for beam scanning and management.

Further, obstruction to each AiP is different at different times. With the methods provided in the embodiments of the present disclosure, real detection and comparison are performed to achieve dynamic switch between AiPs, so as to ensure better communication quality.

DETAILED DESCRIPTION

Figure 1:
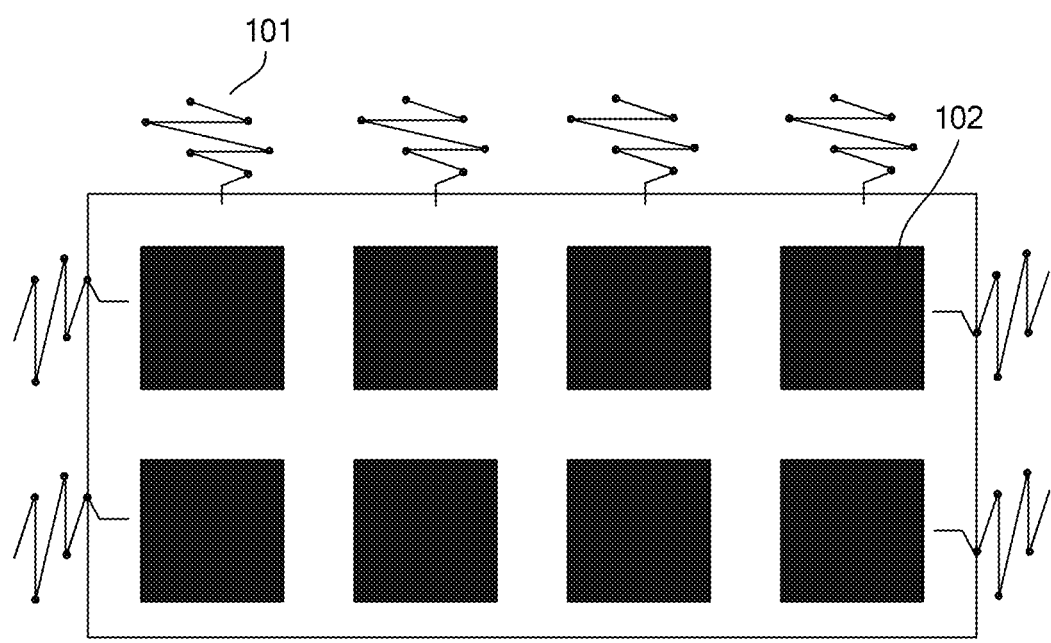
FIG. 1 is a diagram of an AiP according to an embodiment.

As described in the background, in some existing solutions, a terminal performs beam management in a network through the RRC protocol. However, these solutions occupy lots of network resources and cause much power consumption at the terminal. In other existing solutions, antennas or an induction device dedicated to radio frequency environment detection, and corresponding electric tuning elements, signal processing and control circuits are added to a terminal. However, these solutions increase difficulty of hardware structure integration, and size and cost of the terminal.

Inventors found based on researches that, the most common obstruction to the terminal in practice comes from other devices and housings installed near an antenna RF module, human bodies such as hands, and other objects that reflect or refract RF transmission near the terminal. These factors are improbably related to a network status. If the antenna RF module or the terminal directly senses nearby RF environment, the antenna RF module can locally detect and adjust beams, and the terminal can select the optimal configuration of beams, which may improve efficiency of beam adjustment and save power consumption.

Embodiments of the present disclosure provide a beam detection method based on an AiP structure. Signals emitted by at least one UPA array in the AiP structure are detected by at least one corresponding ULA array in the AiP structure, and the detection result is stored. The method may be applied after the design of the AiP structure is finalized. At this time, a fixed physical channel is formed between the at least one UPA array and the at least one ULA array. When the at least one UPA array emits a specific signal, a relatively fixed signal can be detected through the at least one corresponding ULA array. There is no excess obstruction around the AiP structure, that is, the AiP structure is in a relatively ideal environment, and thus the detected result can serve as a preset threshold when the AiP structure is designed. By storing the above detected result, parameter values of signals detected when there is obstruction around the AiP structure can be compared with the stored detected result (i.e., the preset threshold value), and based on the comparison result, a deviation between actually emitted beams and an original design can be determined, so as to adjust the beams accordingly.

Embodiments of the present disclosure further provide a beam adjusting method based on an AiP structure. Signals emitted by at least one UPA array in the AiP structure are detected by at least one corresponding ULA array in the AiP structure, detected characteristic parameter values of the signals are compared with preset signal characteristic parameter values, a phase shifter coupled with the at least one UPA array is adjusted based on the comparison result until optimal beam configuration is reached, and the optimal beam configuration is stored. The method may be applied when the AiP structure is installed in a terminal device. At this time, circuit components and housings around the AiP structure define a definite physical environment. When the at least one UPA array emits a specific signal, the at least one corresponding ULA array can detect a relatively fixed signal. As there is certain obstruction around the AiP structure (i.e., the surrounding circuit components and housings), there is a certain difference between the detected signal characteristic parameter values and the preset signal characteristic parameter values, and the optimal beam configuration for the AiP may be reached by adjusting the corresponding phase shifter.

Embodiments of the present disclosure further provide an antenna module selection method and device. Signals emitted by at least one UPA array in the AiP are detected by at least one corresponding ULA array in the AiP, characteristic parameter values of the signals detected by multiple AiPs are compared with preset signal characteristic parameter values, and the AiP with better performance is selected for signal transmission and reception of a terminal device based on the comparison result. In this way, local detection and management of the beams by the terminal are realized, and no additional hardware is needed, which saves network resources and reduces cost and power consumption of the terminal.

In order to clarify the objects, characteristics and advantages of the disclosure, embodiments of present disclosure will be described in detail in conjunction with accompanying drawings.

Referring to FIG. 1, FIG. 1 illustrates an AiP according to an embodiment. The AiP includes a group of ULA antenna arrays consisting of a plurality of antenna units 101 and a group of UPA antenna arrays consisting of a plurality of antenna units 102. FIG. 1 takes each antenna array including eight antenna units as an example. In some embodiments, one AiP may include multiple groups of ULA antenna arrays and multiple groups of UPA antenna arrays, the number of the groups of ULA antenna arrays is equal to the number of the groups of UPA antenna arrays, and the number of antenna units included in the ULA antenna arrays is equal to the number of antenna units included in the UPA antenna arrays, so as to form one-to-one correspondence.

The UPA array is a main array of AiP. As a phased array has a problem that a main lobe gain decreases and a side lobe gain increases after beams are pointed to a side at a certain angle, the main array UPA is generally set to be no longer a working channel outside a certain maximum working angle, and a spatial area outside the certain maximum working angle is covered by the ULA array. Therefore, at least a group of UPA array and a group of ULA array are designed in an AiP, and independent circuits and control processing channels are configured for them.

Figure 2:
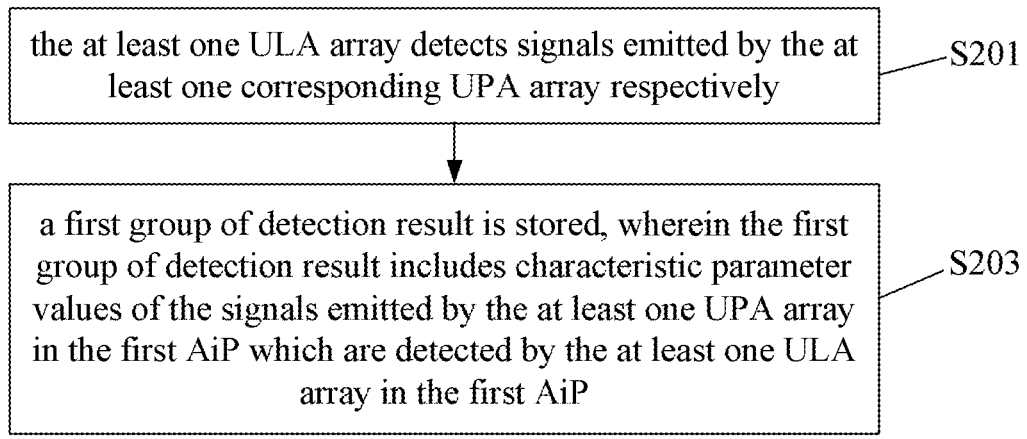
FIG. 2 is a flow chart of a beam detection method based on an AiP structure according to an embodiment.

Referring to FIG. 2, FIG. 2 is a flow chart of a beam detection method based on an AiP structure according to an embodiment.

In some embodiments, the AiP structure at least includes a first AiP, the first AiP includes at least one ULA array and at least one corresponding UPA array.

In S201, the at least one ULA array detects signals emitted by the at least one corresponding UPA array respectively.

After the design of the AiP structure is finalized, a fixed physical channel is formed between the UPA array and the ULA array. When the UPA array emits a specific signal, a relatively fixed signal can be detected by the corresponding ULA array due to a coupling relation between the UPA array and the ULA array.

In some embodiments, the signals emitted by the at least one UPA array are millimeter wave signals.

In some embodiments, each of the at least one ULA array includes a plurality of antenna units, each of the at least one UPA array includes a plurality of antenna units, and the number of the plurality of antenna units included in the ULA array is equal to the number of the plurality of antenna units included in the UPA array. In some embodiments, the at least one ULA array detecting the signals emitted by the at least one corresponding UPA array respectively includes: the plurality of antenna units included in the at least one ULA array detecting signals emitted by the plurality of antenna units included in the at least one corresponding UPA array respectively.

In S203, a first group of detection result is stored, wherein the first group of detection result includes characteristic parameter values of the signals emitted by the at least one UPA array in the first AiP which are detected by the at least one ULA array in the first AiP.

In some embodiments, the first group of detection result includes any combination of following parameters: direction angles, a ratio of a main lobe to a side lobe, side lobe suppression, or power of beams corresponding to the signals emitted by the at least one UPA array in the first AiP which are detected by the at least one ULA array in the first AiP.

In some embodiments, the first group of detection result is stored in a look-up table. The look-up table is set in a baseband processor, and the baseband processor and the AiP structure are connected via a radio frequency front-end circuit.

The beam detection method may be applied after the design of the AiP structure is finalized. In this case, the AiP structure is in an unobstructed state, and the detected characteristic parameter values of the signals emitted by the at least one UPA array serve as preset characteristic parameter values when the AiP structure is designed, i.e., ideal values. By storing the above detected characteristic parameter values, parameter values of signals detected when there is obstruction around the AiP structure can be compared with the stored characteristic parameter values (i.e., the preset characteristic parameter values), and based on the comparison result, a deviation between actually emitted beams and an original design can be determined, so as to adjust the beams accordingly to optimize beam configuration.

To further improve the omnidirectional communication capability in an actual environment and realize a Multiple-Input Multiple-Output (MIMO) function, the AiP structure may include multiple AiPs arranged in various directions to coordinate in operation. At this time, a fixed physical channel is formed among the multiple AiPs. When a UPA array in an AiP transmits a signal, a ULA array in other AiPs can also detect a relatively fixed signal.

Accordingly, in some embodiments, the method further includes: at least one ULA array in the second AiP detecting signals emitted by the at least one UPA array in the first AiP respectively; and storing a second group of detection result, wherein the second group of detection result includes characteristic parameter values of the signals emitted by the at least one UPA array in the first AiP which are detected by the at least one ULA array in the second AiP.

From above, after the design of the AiP structure is finalized, millimeter wave signals emitted by the UPA array in an AiP can be detected by the corresponding ULA array in the same AiP, and also can be detected by the ULA array in other AiPs.

When the AiP structure includes multiple AiPs, the ULA array in each AiP can detect the signals emitted by the corresponding UPA array and the detection result is stored. In some embodiments, the method further includes: at least one ULA array in the second AiP detecting signals emitted by at least one corresponding UPA array in the second AiP respectively; and storing a third group of detection result, wherein the third group of detection result includes characteristic parameter values of the signals emitted by the at least one UPA array in the second AiP which are detected by the at least one ULA array in the second AiP.

Figure 3:
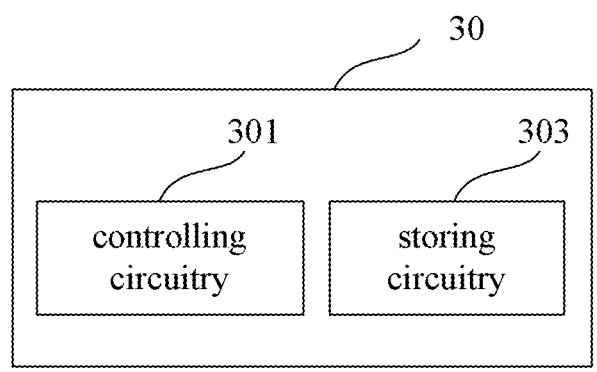
FIG. 3 is a structural diagram of a beam detection device based on an AiP structure according to an embodiment.

Accordingly, a beam detection device based on an AiP structure is provided according to an embodiment. FIG. 3 is a structural diagram of a beam detection device 30 based on an AiP structure. The beam detection device 30 includes a controlling circuitry 301 and a storing circuitry 303.

In some embodiments, the AiP structure at least includes a first AiP, and the first AiP includes at least one ULA array and at least one corresponding UPA array.

The controlling circuitry 301 is configured to control the at least one ULA array to detect signals emitted by the at least one corresponding UPA array respectively.

In some embodiments, the signals emitted by the at least one UPA array are millimeter wave signals.

In some embodiments, each of the at least one ULA array includes a plurality of antenna units, each of the at least one UPA array includes a plurality of antenna units, and the number of the plurality of antenna units included in the ULA array is equal to the number of the plurality of antenna units included in the UPA array. In some embodiments, the controlling circuitry 301 is configured to control the plurality of antenna units included in the at least one ULA array to detect signals emitted by the plurality of antenna units included in the at least one corresponding UPA array respectively.

The storing circuitry 303 is configured to store a first group of detection result, wherein the first group of detection result includes characteristic parameter values of the signals emitted by the at least one UPA array in the first AiP which are detected by the at least one ULA array in the first AiP.

In some embodiments, the first group of detection result includes any combination of following parameters: direction angles, a ratio of a main lobe to a side lobe, side lobe suppression, or power of beams corresponding to the signals emitted by the at least one UPA array in the first AiP which are detected by the at least one ULA array in the first AiP. In some embodiments, the storing circuitry 303 is configured to store the first group of detection result in a look-up table.

In some embodiments, the AiP structure may include multiple AiPs, such as a first AiP and a second AiP. The controlling circuitry 301 is further configured to control at least one ULA array in the second AiP to detect signals emitted by the at least one UPA array in the first AiP respectively, and the storing circuitry 303 is further configured to store a second group of detection result, wherein the second group of detection result includes characteristic parameter values of the signals emitted by the at least one UPA array in the first AiP which are detected by the at least one ULA array in the second AiP.

When the AiP structure includes multiple AiPs, the ULA array in each AiP can detect the signals emitted by the corresponding UPA array and the detection result is stored.

In some embodiments, the AiP structure may include multiple AiPs, such as a first AiP and a second AiP. The controlling circuitry 301 is further configured to control at least one ULA array in the second AiP to detect signals emitted by at least one corresponding UPA array in the second AiP respectively, and the storing circuitry 303 is further configured to store a third group of detection result, wherein the third group of detection result includes characteristic parameter values of the signals emitted by the at least one UPA array in the second AiP which are detected by the at least one ULA array in the second AiP.

In some embodiments, the controlling circuitry 301 may be a processor, such as a CPU, an MCU or a DSP. The storing circuitry 303 may be a ROM, a RAM, a magnetic disk or an optical disk.

In the beam detection method and device based on the AiP structure provided by the above embodiments of the present disclosure, the signals emitted by the UPA array in the AiP structure are detected by the corresponding ULA array in the AiP structure, and the detection result is stored. The method may be applied after the design of the AiP structure is finalized. At this time, a fixed physical channel is formed between the UPA array and the ULA array. When the UPA array emits a specific signal, a relatively fixed signal can be detected through the corresponding ULA array. There is no excess obstruction around the AiP structure, that is, the AiP structure is in a relatively ideal environment, and thus the detected result can serve as a preset threshold when the AiP structure is designed. By storing the above detected result, parameter values of signals detected when there is obstruction around the AiP structure can be compared with the stored detected result (i.e., the preset threshold value), and based on the comparison result, a deviation between actually emitted beams and an original design can be determined, so as to adjust the beams accordingly.

Figure 4:
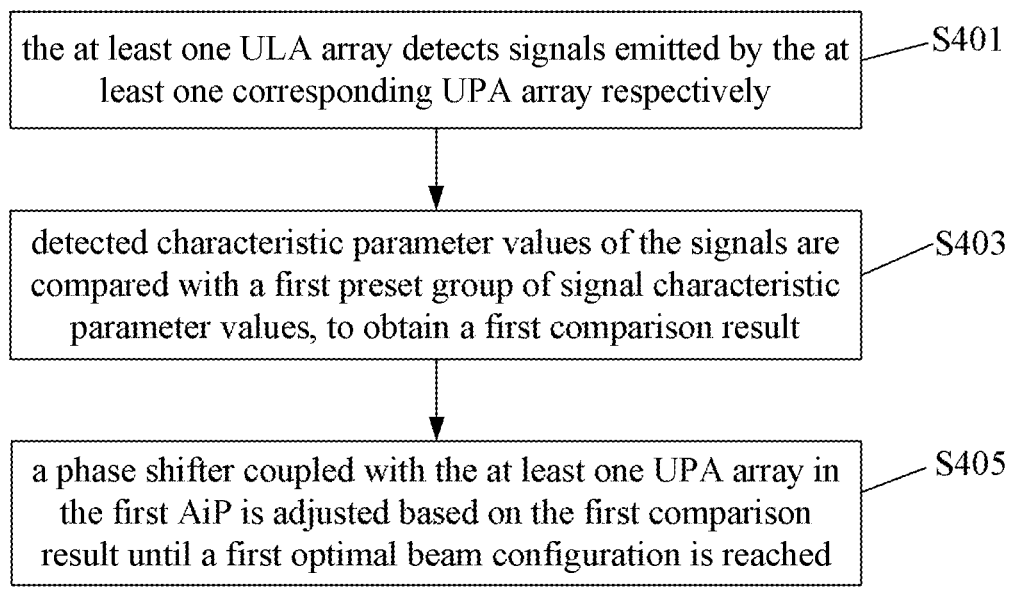
FIG. 4 is a flow chart of a beam adjusting method based on an AiP structure according to an embodiment.

Referring to FIG. 4, FIG. 4 is a flow chart of a beam adjusting method based on an AiP structure according to an embodiment. The beam adjusting method is performed based on the stored detection result in the above beam detection method.

The AiP structure at least includes a first AiP, and the first AiP includes at least one ULA array and at least one corresponding UPA array.

In S401, the at least one ULA array detects signals emitted by the at least one corresponding UPA array respectively.

When the AiP structure is installed in a terminal device, not only a fixed physical channel is formed between the UPA array and the ULA array, but also circuit components and housings around the AiP structure define a definite physical environment. When the UPA array emits a specific signal, the corresponding ULA array can detect a relatively fixed signal. As there is certain obstruction around the AiP structure compared with a situation before the installation of the AiP structure, beams corresponding to the signals emitted by the antenna array may be reflected.

In some embodiments, the signals emitted by the at least one UPA array are millimeter wave signals.

In some embodiments, each of the at least one ULA array includes a plurality of antenna units, each of the at least one UPA array includes a plurality of antenna units, and the number of the plurality of antenna units included in the ULA array is equal to the number of the plurality of antenna units included in the UPA array. In some embodiments, the at least one ULA array detecting the signals emitted by the at least one corresponding UPA array respectively includes: the plurality of antenna units included in the at least one ULA array detecting signals emitted by the plurality of antenna units included in the at least one corresponding UPA array respectively.

In S403, detected characteristic parameter values of the signals are compared with a first preset group of signal characteristic parameter values, to obtain a first comparison result.

After the AiP structure is installed in the terminal device, circuit components and housings around the AiP structure cause certain obstruction to the AiP structure. Accordingly, beams corresponding to the signals emitted by the antenna arrays have a deviation from a preset situation when the design of the AiP structure is finalized, which may affect performance. Therefore, the antenna arrays need to be adjusted based on the deviation, to make the beams be close to the preset situation.

In some embodiments, the detected characteristic parameter values of the signals include any combination of following parameters: direction angles, a ratio of a main lobe to a side lobe, side lobe suppression, or power of beams corresponding to the signals emitted by the at least one UPA array in the first AiP which are detected by the at least one ULA array in the first AiP.

In some embodiments, the first preset group of signal characteristic parameter values includes: characteristic parameter values of the signals emitted by the at least one UPA array which are detected by the at least one ULA array when the AiP structure is in an unobstructed state, i.e., the first group of detection result stored in S203 of the above beam detection method.

In S405, a phase shifter coupled with the at least one UPA array in the first AiP is adjusted based on the first comparison result until a first optimal beam configuration is reached.

In some embodiments, the antenna module is connected with a radio frequency front-end circuit which may include a low-noise amplifier, a power amplifier, a phase shifter, a transmission variable gain amplifier, a reception variable gain amplifier, a combiner, a power splitter, a phase-locked loop, a frequency conversion and an oscillator. Based on the comparison result in S403, the phase shifter connected to the corresponding UPA array may be adjusted so that the beams corresponding to the signals can reach optimal configuration.

In some embodiments, reaching the first optimal beam configuration includes: deviation of power of beams corresponding to the signals emitted by the at least one UPA array from a preset power being within 10%, or deviation of side lobe suppression of beams corresponding to the signals emitted by the at least one UPA array from a preset side lobe suppression being within 10%.

In some embodiments, when the first optimal beam configuration is reached, the side lobe suppression of the beams corresponding to the signals emitted by the at least one UPA array is 15 dB.

In some embodiments, the method further includes: storing the first optimal beam configuration.

The beam adjusting method may be applied when the AiP structure is installed in the terminal device. In this case, obstruction to the AiP structure is caused by circuit components around the AiP structure and housings of the terminal device. Based on the adjustment in S405, the beams corresponding to the signals emitted by the UPA arrays in the AiP structure may reach the optimal configuration.

As described above, the ULA array in an AiP can be used to detect the signals emitted by the corresponding UPA array in the AiP. To further improve the omnidirectional communication capability in an actual environment and realize a MIMO function, the AiP structure may include multiple AiPs arranged in various directions to coordinate in operation. At this time, a fixed physical channel is formed among the multiple AiPs. When a UPA array in an AiP transmits a signal, a ULA array in other AiPs can also detect a relatively fixed signal.

In some embodiments, the AiP structure may include multiple AiPs, such as a first AiP and a second AiP. The method further includes: at least one ULA array in the second AiP detecting signals emitted by at least one UPA array in the first AiP; comparing characteristic parameter values of the signals emitted by the at least one UPA array in the first AiP which are detected by the at least one ULA array in the second AiP with a second preset group of signal characteristic parameter values, to obtain a second comparison result; and adjusting the phase shifter coupled with the at least one UPA array in the first AiP based on the second comparison result until a second optimal beam configuration is reached.

In some embodiments, the characteristic parameter values of the signals emitted by the at least one UPA array in the first AiP which are detected by the at least one ULA array in the second AiP include any combination of following parameters: direction angles, a ratio of a main lobe to a side lobe, side lobe suppression, or power of beams corresponding to the signals emitted by the at least one UPA array in the first AiP which are detected by the at least one ULA array in the second AiP.

Similarly, the second preset group of signal characteristic parameter values includes: characteristic parameter values of the signals emitted by the at least one UPA array in the first AiP which are detected by the at least one ULA array in the second AiP when the AiP structure is in an unobstructed state, i.e., the second group of detection result stored in the above beam detection method.

Similarly, reaching the second optimal beam configuration includes: deviation of power of beams corresponding to the signals emitted by the at least one UPA array in the first AiP which is detected by the at least one ULA array in the second AiP from a preset power being within 10%, or deviation of side lobe suppression of beams corresponding to the signals emitted by the at least one UPA array in the first AiP which is detected by the at least one ULA array in the second AiP from a preset side lobe suppression being within 10%.

In some embodiments, phase shifters may be adjusted based on the detection result of a same AiP and the detection result of different AiPs, so as to provide better adjustment for beams.

When the AiP structure includes multiple AiPs, the ULA array in each AiP can detect the signals emitted by the corresponding UPA array in the AiP, detected characteristic parameter values of the signals are compared with preset signal characteristic parameter values of the UPA array, and the phase shifter connected to the UPA array is adjusted based on the comparison result until corresponding optimal beam configuration is reached.

In some embodiments, the method further includes: the at least one ULA array in the second AiP detecting signals emitted by the at least one UPA array in the second AiP; comparing characteristic parameter values of the signals emitted by the at least one UPA array in the second AiP which are detected by the at least one ULA array in the second AiP with a third preset group of signal characteristic parameter values, to obtain a third comparison result; and adjusting a phase shifter coupled with the at least one UPA array in the second AiP based on the third comparison result until a third optimal beam configuration is reached.

Similarly, the third preset group of signal characteristic parameter values includes: characteristic parameter values of the signals emitted by the at least one UPA array in the second AiP which are detected by the at least one ULA array in the second AiP when the AiP structure is in an unobstructed state.

Similarly, reaching the third optimal beam configuration includes: deviation of power of beams corresponding to the signals emitted by the at least one UPA array in the second AiP which is detected by the at least one ULA array in the second AiP from a preset power being within 10%, or deviation of side lobe suppression of beams corresponding to the signals emitted by the at least one UPA array in the second AiP which is detected by the at least one ULA array in the second AiP from a preset side lobe suppression being within 10%.

In some embodiments, the method further includes: storing the second optimal beam configuration and/or the third optimal beam configuration.

In the beam adjusting method based on the AiP structure provided by the above embodiments of the present disclosure, the signals emitted by the UPA array in the AiP structure are detected by the corresponding ULA array in the AiP structure, the detected characteristic parameter values of the signals are compared with the preset signal characteristic parameter values, the phase shifter coupled with the UPA array is adjusted based on the comparison result until the optimal beam configuration is reached, and the optimal beam configuration is stored. The method may be applied when the AiP structure is installed in a terminal device. At this time, circuit components and housings around the AiP structure define a definite physical environment. When the UPA array emits a specific signal, the corresponding ULA array can detect a relatively fixed signal. As there is certain obstruction around the AiP structure (i.e., the surrounding circuit components and housings), there is a certain difference between the detected signal characteristic parameter values and the preset signal characteristic parameter values, and the optimal beam configuration for the AiP may be reached by adjusting the corresponding phase shifter. That is, the stored detection results in the above embodiments of the beam detection method are used to realize beam adjustment.

In the above beam adjusting method, storing the optimal beam configuration has following advantages. When the terminal device including the AiP structure is applied in practice, there will be more obstruction around it. In this case, detected parameter values of signals can be compared with the stored optimal beam configuration, and the AiP with better performance in the AiP structure can be selected for signal transmission and reception based on the comparison result.

Figure 5:
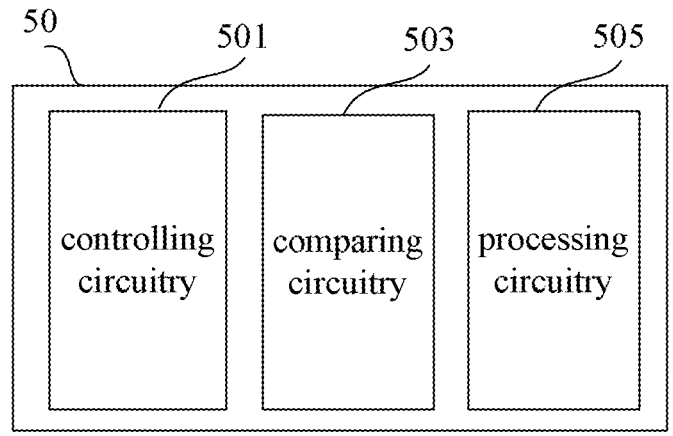
FIG. 5 is a structural diagram of a beam adjusting device based on an AiP structure according to an embodiment.

Accordingly, a beam adjusting device based on an AiP structure is provided according to an embodiment. FIG. 5 is a structural diagram of a beam adjusting device 50 based on an AiP structure. The beam adjusting device 50 includes a controlling circuitry 501, a comparing circuitry 503 and a processing circuitry 505.

The AiP structure at least includes a first AiP which includes at least one ULA array and at least one corresponding UPA array.

The controlling circuitry 501 is configured to control the at least one ULA array to detect signals emitted by the at least one corresponding UPA array respectively, the comparing circuitry 503 is configured to compare detected characteristic parameter values of the signals with a first preset group of signal characteristic parameter values, to obtain a first comparison result, and the processing circuitry 505 is configured to adjust a phase shifter coupled with the at least one UPA array based on the first comparison result until a first optimal beam configuration is reached.

In some embodiments, the detected characteristic parameter values of the signals include any combination of following parameters: direction angles, a ratio of a main lobe to a side lobe, side lobe suppression, or power of beams corresponding to the signals emitted by the at least one UPA array in the first AiP which are detected by the at least one ULA array in the first AiP.

In some embodiments, reaching the first optimal beam configuration includes: deviation of power of beams corresponding to the signals emitted by the at least one UPA array from a preset power being within 10%, or deviation of side lobe suppression of beams corresponding to the signals emitted by the at least one UPA array from a preset side lobe suppression being within 10%.

In some embodiments, when the first optimal beam configuration is reached, the side lobe suppression of the beams corresponding to the signals emitted by the at least one UPA array is 15 dB.

In some embodiments, the AiP structure is disposed in a terminal device.

In some embodiments, the first preset group of signal characteristic parameter values includes: characteristic parameter values of the signals emitted by the at least one UPA array in the first AiP which are detected by the at least one ULA array in the first AiP when the AiP structure is in an unobstructed state.

In some embodiments, the device further includes: a storing circuitry configured to store the first optimal beam configuration.

In some embodiments, the AiP structure further includes a second AiP, the second AiP includes at least one ULA array and at least one corresponding UPA array, the controlling circuitry 301 is further configured to control the at least one ULA array in the second AiP to detect signals emitted by the at least one UPA array in the first AiP, the comparing circuitry 303 is further configured to compare characteristic parameter values of the signals emitted by the at least one UPA array in the first AiP which are detected by the at least one ULA array in the second AiP with a second preset group of signal characteristic parameter values, to obtain a second comparison result, and the processing circuitry 305 is further configured to adjust the phase shifter coupled with the at least one UPA array in the first AiP based on the second comparison result until a second optimal beam configuration is reached.

In some embodiments, the characteristic parameter values of the signals emitted by the at least one UPA array in the first AiP which are detected by the at least one ULA array in the second AiP include any combination of following parameters: direction angles, a ratio of a main lobe to a side lobe, side lobe suppression, or power of beams corresponding to the signals emitted by the at least one UPA array in the first AiP which are detected by the at least one ULA array in the second AiP.

Similarly, the second preset group of signal characteristic parameter values includes: characteristic parameter values of the signals emitted by the at least one UPA array in the first AiP which are detected by the at least one ULA array in the second AiP when the AiP structure is in an unobstructed state, i.e., the second group of detection result stored in the above beam detection method.

Similarly, reaching the second optimal beam configuration includes: deviation of power of beams corresponding to the signals emitted by the at least one UPA array in the first AiP which is detected by the at least one ULA array in the second AiP from a preset power being within 10%, or deviation of side lobe suppression of beams corresponding to the signals emitted by the at least one UPA array in the first AiP which is detected by the at least one ULA array in the second AiP from a preset side lobe suppression being within 10%.

In some embodiments, the AiP structure further includes a second AiP, the second AiP includes at least one ULA array and at least one corresponding UPA array, the controlling circuitry 501 is further configured to control the at least one ULA array in the second AiP to detect signals emitted by the at least one UPA array in the second AiP, the comparing circuitry 503 is further configured to compare characteristic parameter values of the signals emitted by the at least one UPA array in the second AiP which are detected by the at least one ULA array in the second AiP with a third preset group of signal characteristic parameter values, to obtain a third comparison result, and the processing circuitry 505 is further configured to adjust a phase shifter coupled with the at least one UPA array in the second AiP based on the third comparison result until a third optimal beam configuration is reached.

Similarly, the third preset group of signal characteristic parameter values includes: characteristic parameter values of the signals emitted by the at least one UPA array in the second AiP which are detected by the at least one ULA array in the second AiP when the AiP structure is in an unobstructed state.

Similarly, reaching the third optimal beam configuration includes: deviation of power of beams corresponding to the signals emitted by the at least one UPA array in the second AiP which is detected by the at least one ULA array in the second AiP from a preset power being within 10%, or deviation of side lobe suppression of beams corresponding to the signals emitted by the at least one UPA array in the second AiP which is detected by the at least one ULA array in the second AiP from a preset side lobe suppression being within 10%.

In some embodiments, the storing circuitry is further configured to store the second optimal beam configuration and/or the third optimal beam configuration.

In some embodiments, the controlling circuitry 501, the comparing circuitry 503 and/or the processing circuitry 505 may be a processor, such as a CPU, an MCU or a DSP. The storing circuitry may be a ROM, a RAM, a magnetic disk or an optical disk.

As described in the above embodiments, the first preset group of signal characteristic parameter values, the second preset group of signal characteristic parameter values, and the third preset group of signal characteristic parameter values include: characteristic parameter values of the signals emitted by at least one UPA array in a particular AiP which are detected by at least one ULA array in a corresponding AiP, when the AiP structure is in an unobstructed state, i.e., when the AiP structure has just been designed and finalized and has not been installed in a terminal device.

Figure 6:
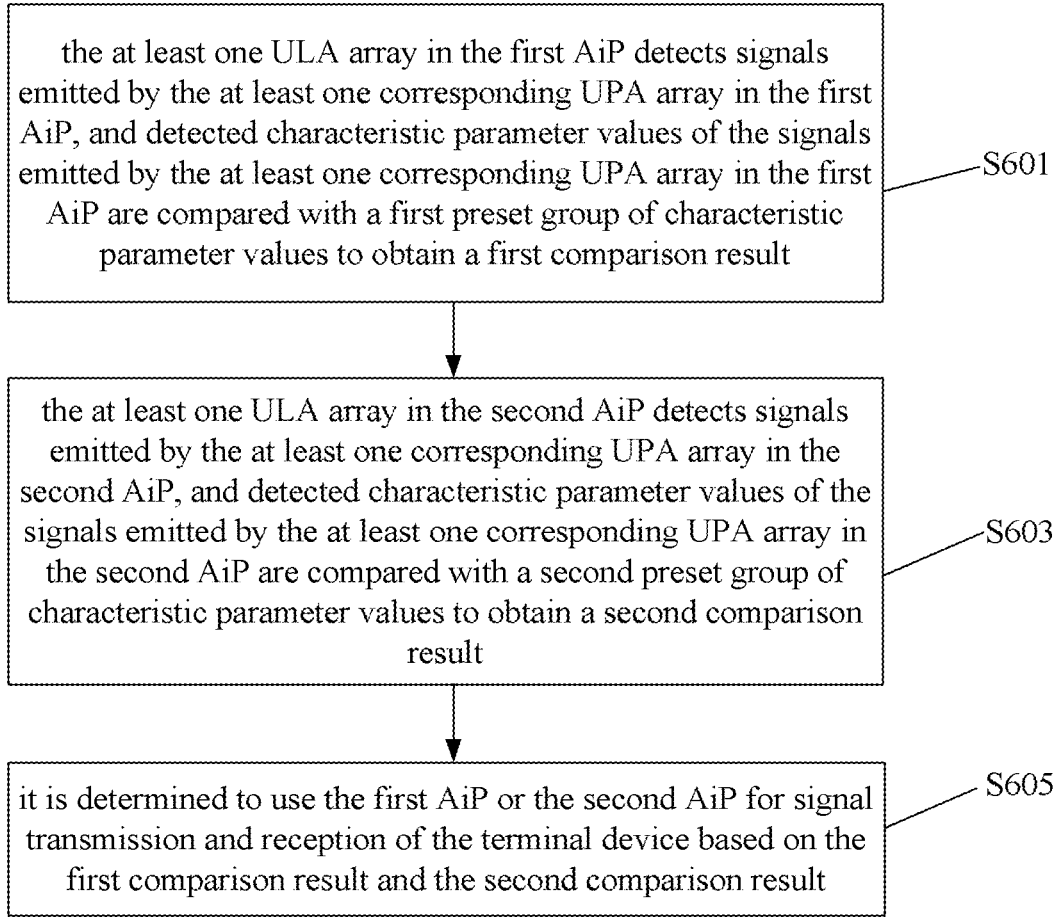
FIG. 6 is a flow chart of an antenna module selection method according to an embodiment.

Referring to FIG. 6, FIG. 6 is a flow chart of an antenna module selection method according to an embodiment. The antenna module selection method is applied to a terminal device and performed based on the stored optimal beam configuration in the above beam adjusting method. The terminal device includes multiple AiPs, such as a first AiP and a second AiP, and each of the first and second AiPs includes at least one ULA array and at least one corresponding UPA array. The multiple AiPs are disposed in different positions within the terminal device.

When the UPA array emits a specific signal, a relatively fixed signal can be detected by the corresponding ULA array due to a coupling relation between the UPA array and the ULA array.

In S601, the at least one ULA array in the first AiP detects signals emitted by the at least one corresponding UPA array in the first AiP, and detected characteristic parameter values of the signals emitted by the at least one corresponding UPA array in the first AiP are compared with a first preset group of characteristic parameter values to obtain a first comparison result.

In S603, the at least one ULA array in the second AiP detects signals emitted by the at least one corresponding UPA array in the second AiP, and detected characteristic parameter values of the signals emitted by the at least one corresponding UPA array in the second AiP are compared with a second preset group of characteristic parameter values to obtain a second comparison result.

In S605, it is determined to use the first AiP or the second AiP for signal transmission and reception of the terminal device based on the first comparison result and the second comparison result.

In some embodiments, the signals emitted by the at least one UPA array are millimeter wave signals.

In some embodiments, each of the at least one ULA array includes a plurality of antenna units, each of the at least one UPA array includes a plurality of antenna units, and the number of the plurality of antenna units included in the ULA array is equal to the number of the plurality of antenna units included in the UPA array. In some embodiments, the at least one ULA array detecting the signals emitted by the at least one corresponding UPA array respectively includes: the plurality of antenna units included in the at least one ULA array detecting signals emitted by the plurality of antenna units included in the at least one corresponding UPA array respectively.

In some embodiments, the characteristic parameter values include power of beams corresponding to the signals and/or a size of a side lobe of beams corresponding to the signals.

In some embodiments, the first preset group of characteristic parameter values includes characteristic parameter values about the first AiP which have been pre-stored in the terminal device, and the second preset group of characteristic parameter values includes characteristic parameter values about the second AiP which have been pre-stored in the terminal device. The first or second preset group of characteristic parameter values may be pre-stored in a look-up table of a baseband processor of the terminal device when the terminal device leaves a factory, that is, may be the optimal beam configuration stored in the beam adjusting method provided by the foregoing embodiments. In some embodiments, the first preset group of characteristic parameter values may be the first optimal beam configuration stored in the above beam adjusting method, and the second preset group of characteristic parameter values may be the third optimal beam configuration stored in the above beam adjusting method.

When AiP is applied to terminal device, in addition to peripheral circuit devices around the AiP and housings of the terminal device, the AiP may be blocked further by human bodies, such as hands, and other objects that reflect or refract RF transmission near the terminal device. Due to these obstructions, the beams corresponding to the signals emitted by the antenna array has a certain deviation from those before the AiP is applied to the terminal device, that is, actual performance of the beams has a deviation from preset performance. The multiple AiPs in the terminal device are disposed in different positions within the terminal device, so each AiP is subjected to different degrees of obstruction at the same time. To ensure communication quality, it is necessary to select the AiP whose performance is closest to the preset performance to perform signal transmission and reception of the terminal device.

In some embodiments, comparing detected characteristic parameter values of the signals emitted by the at least one corresponding UPA array in the first AiP with a first preset group of characteristic parameter values to obtain a first comparison result includes: calculating a first difference between the detected characteristic parameter values of the signals emitted by the at least one corresponding UPA array in the first AiP and the first preset group of characteristic parameter values; and calculating a first ratio of the first difference to the first preset group of characteristic parameter values as the first comparison result. That is, by the comparison in S601, a deviation of performance of the signals emitted by the at least one corresponding UPA array in the first AiP from preset performance is acquired.

In some embodiments, comparing detected characteristic parameter values of the signals emitted by the at least one corresponding UPA array in the second AiP with a second preset group of characteristic parameter values to obtain a second comparison result includes: calculating a second difference between the detected characteristic parameter values of the signals emitted by the at least one corresponding UPA array in the second AiP and the second preset group of characteristic parameter values; and calculating a second ratio of the second difference to the second preset group of characteristic parameter values as the second comparison result. That is, by the comparison in S603, a deviation of performance of the signals emitted by the at least one corresponding UPA array in the second AiP from preset performance is acquired.

The first ratio and the second ratio reflect a degree of obstruction to the first AiP and the second AiP. The larger the ratio, the more severe the obstruction.

In some embodiments, determining to use the first AiP or the second AiP for signal transmission and reception of the terminal device based on the first comparison result and the second comparison result includes: comparing the first ratio with the second ratio; and selecting the AiP corresponding to the smaller ratio of the first and second ratios for signal transmission and reception of the terminal device. That is, S605 used the comparison results in S601 and S603 to select the AiP whose performance is closest to the preset performance to perform signal transmission and reception.

In some embodiments, using the first AiP or the second AiP for signal transmission and reception of the terminal device includes: using the at least one UPA array in the first AiP for signal transmission and reception of the terminal device, or using the at least one UPA array in the second AiP for signal transmission and reception of the terminal device.

In the above embodiments, signal transmission and reception of the terminal device is performed by the UPA arrays. In some embodiments, the method further includes: if both the first comparison result and the second comparison result exceed a predetermined threshold (which indicates that if the corresponding UPA array continues to be used for signal transmission, parameters of the beams may greatly deviate from original design), using the at least one ULA array in the first AiP for signal transmission and reception of the terminal device, or using the at least one ULA array in the second AiP for signal transmission and reception of the terminal device.

In some embodiments, the method further includes: if both the first comparison result and the second comparison result exceed a predetermined threshold, using an RRC protocol to perform beam scanning management.

It should be noted that the first AiP and the second AiP are taken as examples to represent multiple AiPs. In practice, when the method is employed, S601 to S605 may be performed for all AiPs included in the terminal device, so as to find the AiP with the optimal beam configuration for signal transmission and reception of the terminal device.

As each AiP is disposed in a different location of the terminal device, obstruction to each AiP is different at different times, that is, beam quality corresponding to the signals transmitted by each AiP is not the same. The above method may be used to detect and compare in real-time to achieve dynamic switching among AiPs to ensure better communication quality.

Figure 7:
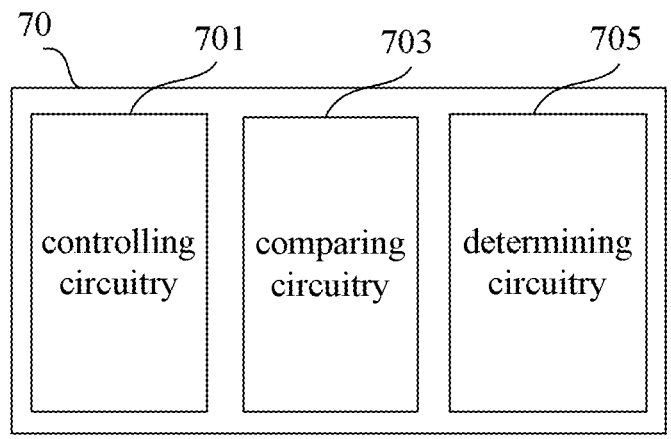
FIG. 7 is a structural diagram of an antenna module selection device according to an embodiment.

Accordingly, an antenna module selection device is provided according to an embodiment. FIG. 7 is a structural diagram of an antenna module selection device 70 which is applied to a terminal device. The terminal device at least includes a first AiP and a second AiP, and each of the first and second AiPs includes at least one ULA array and at least one corresponding UPA array.

The antenna module selection device 70 includes a controlling circuitry 701, a comparing circuitry 703 and a determining circuitry 705.

The controlling circuitry 701 is configured to control the at least one ULA array in the first AiP to detect signals emitted by the at least one corresponding UPA array in the first AiP, and control the at least one ULA array in the second AiP to detect signals emitted by the at least one corresponding UPA array in the second AiP.

The comparing circuitry 703 is configured to compare detected characteristic parameter values of the signals emitted by the at least one corresponding UPA array in the first AiP with a first preset group of characteristic parameter values to obtain a first comparison result, and compare detected characteristic parameter values of the signals emitted by the at least one corresponding UPA array in the second AiP with a second preset group of characteristic parameter values to obtain a second comparison result.

The determining circuitry 705 is configured to determine to use the first AiP or the second AiP for signal transmission and reception of the terminal device based on the first comparison result and the second comparison result.

In some embodiments, the characteristic parameter values include power of beams corresponding to the signals, and/or a size of a side lobe of beams corresponding to the signals.

In some embodiments, the comparing circuitry 703 is further configured to: calculate a first difference between the detected characteristic parameter values of the signals emitted by the at least one corresponding UPA array in the first AiP and the first preset group of characteristic parameter values; and calculate a first ratio of the first difference to the first preset group of characteristic parameter values as the first comparison result.

In some embodiments, the comparing circuitry 703 is further configured to: calculate a second difference between the detected characteristic parameter values of the signals emitted by the at least one corresponding UPA array in the second AiP and the second preset group of characteristic parameter values; and calculate a second ratio of the second difference to the second preset group of characteristic parameter values as the second comparison result.

In some embodiments, the determining circuitry 705 is further configured to: compare the first ratio with the second ratio; and select the AiP corresponding to the smaller ratio of the first and second ratios for signal transmission and reception of the terminal device.

In some embodiments, the determining circuitry 705 is further configured to: determine to use the at least one UPA array in the first AiP for signal transmission and reception of the terminal device, or to use the at least one UPA array in the second AiP for signal transmission and reception of the terminal device.

In some embodiments, the determining circuitry 705 is further configured to: if both the first comparison result and the second comparison result exceed a predetermined threshold, determine to use the at least one ULA array in the first AiP for signal transmission and reception of the terminal device, or to use the at least one ULA array in the second AiP for signal transmission and reception of the terminal device.

In some embodiments, the determining circuitry 705 is further configured to: if both the first comparison result and the second comparison result exceed a predetermined threshold, determine to use an RRC protocol to perform beam scanning management.

In some embodiments, the controlling circuitry 701, the comparing circuitry 703 and/or the determining circuitry 505 may be a processor, such as a CPU, an MCU or a DSP.

In the antenna module selection method and device provided by embodiments of the present disclosure, the signals emitted by the UPA array in the AiP are detected by the corresponding ULA array in the AiP, the characteristic parameter values of the signals detected by multiple AiPs are compared with the preset signal characteristic parameter values, and the AiP with better performance is selected for signal transmission and reception of the terminal device based on the comparison result. In this way, local detection and management of the beams by the terminal are realized, and no additional hardware is needed, which saves network resources and reduces cost and power consumption of the terminal.

Further, the UPA array in the AiP is used for signal transmission and reception by default. If it is detected that beam performance of the signals emitted by the UPA arrays is not good, the ULA array in the AiP may be used for signal transmission and reception.

Further, the UPA array in the AiP is used for signal transmission and reception by default. If it is detected that beam performance of the signals emitted by the UPA arrays is not good, the RRC protocol may be used for beam scanning and management.

Further, obstruction to each AiP is different at different times. With the methods provided in the embodiments of the present disclosure, real detection and comparison are performed to achieve dynamic switch between AiPs, so as to ensure better communication quality.

Embodiments of the present disclosure further provide a computer readable storage medium having computer instructions stored therein, wherein when the computer instructions are executed, any one of the above methods is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A beam adjusting method based on an Antenna in Package (AiP) structure, wherein the AiP structure at least comprises a first AiP, the first AiP comprises at least one Uniform Linear Array (ULA) array and at least one corresponding Uniform Planar Array (UPA) array, and the method comprises:

the at least one ULA array detecting signals emitted by the at least one corresponding UPA array respectively;

comparing detected characteristic parameter values of the signals with a first preset group of signal characteristic parameter values, to obtain a first comparison result; and adjusting a phase shifter coupled with the at least one UPA array based on the first comparison result until a first optimal beam configuration is reached, wherein the first preset group of signal characteristic parameter values comprises: characteristic parameter values of the signals emitted by the at least one UPA array which are detected by the at least one ULA array when the AiP structure is in an unobstructed state.

2. The method according to claim 1, wherein the detected characteristic parameter values of the signals comprise any combination of following parameters: direction angles, a ratio of a main lobe to a side lobe, side lobe suppression, or power of beams corresponding to the signals emitted by the at least one UPA array which are detected by the at least one ULA array.

3. The method according to claim 1, wherein reaching the first optimal beam configuration comprises:

deviation of power of beams corresponding to the signals emitted by the at least one UPA array from a preset power being within 10%, or deviation of side lobe suppression of beams corresponding to the signals emitted by the at least one UPA array from a preset side lobe suppression being within 10%.

4. The method according to claim 1, wherein the AiP structure further comprises a second AiP, the second AiP comprises at least one ULA array and at least one corresponding UPA array, and the method further comprises:

the at least one ULA array in the second AiP detecting signals emitted by the at least one UPA array in the first AiP;

comparing characteristic parameter values of the signals emitted by the at least one UPA array in the first AiP which are detected by the at least one ULA array in the second AiP with a second preset group of signal characteristic parameter values, to obtain a second comparison result; and adjusting the phase shifter coupled with the at least one UPA array in the first AiP based on the second comparison result until a second optimal beam configuration is reached.

5. The method according to claim 4, wherein the characteristic parameter values of the signals emitted by the at least one UPA array in the first AiP which are detected by the at least one ULA array in the second AiP comprise any combination of following parameters: direction angles, a ratio of a main lobe to a side lobe, side lobe suppression, or power of beams corresponding to the signals emitted by the at least one UPA array in the first AiP which are detected by the at least one ULA array in the second AiP.

6. The method according to claim 1, wherein the AiP structure further comprises a second AiP, the second AiP comprises at least one ULA array and at least one corresponding UPA array, and the method further comprises:

the at least one ULA array in the second AiP detecting signals emitted by the at least one UPA array in the second AiP;

comparing characteristic parameter values of the signals emitted by the at least one UPA array in the second AiP which are detected by the at least one ULA array in the second AiP with a third preset group of signal characteristic parameter values, to obtain a third comparison result; and adjusting a phase shifter coupled with the at least one UPA array in the second AiP based on the third comparison result until a third optimal beam configuration is reached.

7. A non-transitory computer readable storage medium having computer instructions stored therein, wherein when the computer instructions are executed, the method according to claim 1 is performed.

* * * * *